(No Model.)

C. H. COWDREY.
SELF OILING PULLEY.

No. 255,418. Patented Mar. 28, 1882.

Witnesses.

Inventor.
Charles H. Cowdrey
by Crosby & Gregory
Attys

UNITED STATES PATENT OFFICE.

CHARLES H. COWDREY, OF FITCHBURG, MASSACHUSETTS.

SELF-OILING PULLEY.

SPECIFICATION forming part of Letters Patent No. 255,418, dated March 28, 1882.

Application filed February 17, 1882. (No model.)

*To all whom it may concern:*

Be it known that I, CHARLES H. COWDREY, of Fitchburg, county of Worcester, and State of Massachusetts, have invented an Improvement in Self-Oiling Pulleys, of which the following description, in connection with the accompanying drawings, is a specification.

This invention in self-oiling pulleys has for its object such a construction of the pulley as will compel a proper circulation of the oil therein over the shaft on which the said pulley runs, the oil being at the same time secluded from dust, and the pulley being made strong and durable.

My invention consists in a cast-metal pulley having a hub and rim provided with oil passages and chambers, as will be more fully set forth and claimed at the end of this specification; also, in a cast-metal pulley, a series of prongs or fingers connected with the rim part of the pulley to conduct oil to and deliver it in the oil-passages of the hub, and to stir or keep in motion the oil in the annular chamber of the pulley.

Figure 1:
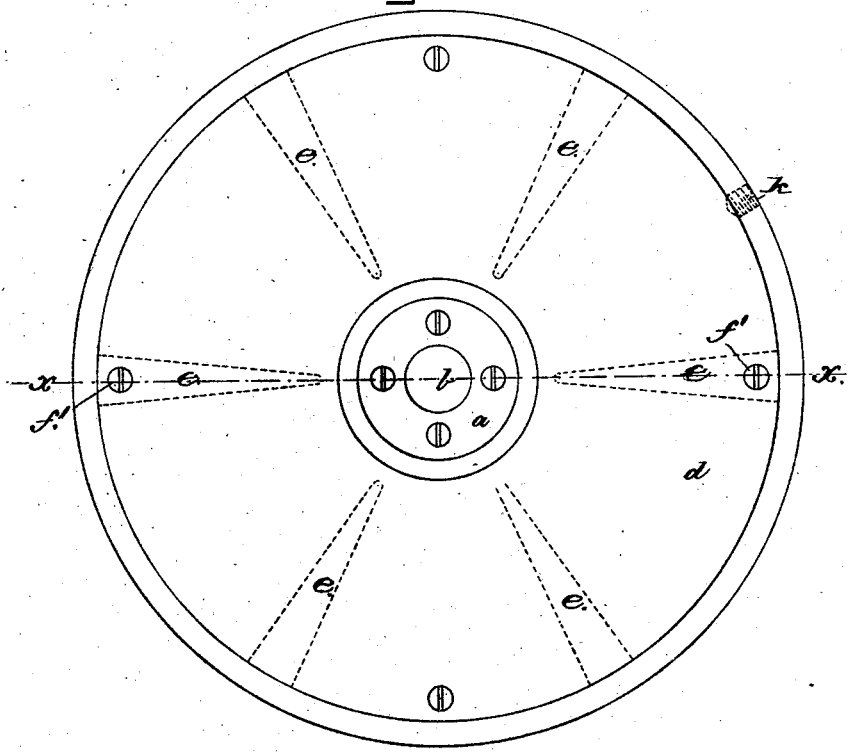
Figure 2:
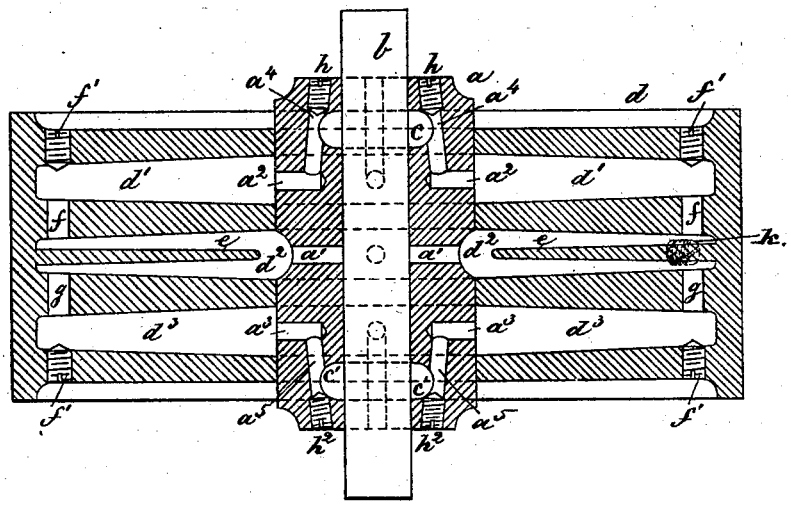

Figure 1 represents, in side elevation, a self-oiling pulley supposed to contain my improvements, and Fig. 2 a horizontal section thereof on the line $x\,x$.

The hub $a$ of the pulley which runs on the shaft $b$ is bored radially to form a series of oil-holes, $a'\,a'$, leading directly to the shaft, and with other series, $a^2\,a^3$, leading partially into the said hub, where they are intersected by holes, $a^4\,a^5$, bored from the ends of the hub $a$, the holes $a^4\,a^5$ also intersecting the annular grooves $c\,c'$, made at the interior of the hub.

The "rim part" $d$ of the pulley, as I denominate all that part of it outside the hub $a$, is cored and cast to form a shell with chambers or spaces $d'\,d^2\,d^3$, there being left in the chamber $d^2$ a series of six or more prongs or fingers, $e$, shown in section in Fig. 2, and in dotted lines, Fig. 1, the said prongs or fingers extending from the interior of the belt-receiving part of the pulley toward the hub and tapering to a point toward the hub, the free ends of the said prongs terminating preferably at or opposite the openings $a'$, leading through the hub to the shaft $b$. In order to enable the soil to circulate in the said rim, it is provided with passages $f\,g$, formed by boring or drilling a hole through the dividing webs or walls of the rim from side to side, the said holes being subsequently closed at the outsides of the rim by screws $f'$, or otherwise, to prevent the escape of oil. The holes $a^4\,a^5$ are for a like reason closed by the screws $h\,h^2$. The oil or other lubricant to lubricate the pulley is introduced therein through an inlet in the outer or belt-receiving face of the rim, the said inlet being closed by a screw or other plug, $k$. (Shown in dotted lines.)

The prongs or fingers $e$ resting in the oil in the annular chamber $d^2$ keeps the said oil in agitation and circulation as the pulley is rotated. The dotted lines on the shaft $b$, Fig. 2, represent oil-passages in the hub at the other side of the shaft, passages like those already described. The oil introduced at the inlet into the chamber $d^2$ flows through passages $a'$ to the shaft $b$, thence between the hub and shaft to the annular grooves $c\,c'$, thence out along passages $a^4\,a^2$ into chamber $d'$, or along passages $a^5\,a^3$ into chamber $d^3$, and from the said chambers $d'\,d^3$, through the passages $f\,g$, back again into chamber $d^2$. Whenever the prongs or fingers $e$ are uppermost, the oil in the chamber $d^2$ flows readily down over them to the hub. The tapered fingers $e$ also act to overcome the centrifugal tendency of the oil to fly out and remain out against the walls of the chambers $d^2$, most remote from the shaft $b$. The rim is driven or shrunk on the hub $a$, so that the two are practically fixed together immovably, and so as to prevent the passage of oil from the joint between them.

The annular grooves $c\,c'$ in the hub enable me to carry the oil out beyond the chambers $d'\,d^3$ quite to the ends of the hub.

I claim—

1. In a self-oiling pulley, the rim having communicating annular chambers $d'\,d^2\,d^3$, combined with the hub provided with oil-passages $a'$, leading from the chamber $d^2$ to the shaft on which the pulley runs, and with other passages, substantially as described, to convey the oil from the ends of the hub into the chambers $d'\,d^3$, as and for the purpose set forth.

2. The hub provided with oil-passages $a'$ and $c\,c'$, the latter being located nearer the end of the hub than the chambers $d'$ $d^3$ of the rim, and with passages $a^4$ $a^2$ $a^5$ $a^3$, combined with the rim $d$, having communicating chambers $d'$ $d^2$ $d^3$, substantially as and for the purpose described.

3. In a self-oiling pulley, the cast-metal rim provided with the chamber $d^2$, and the prongs and fingers $e$, located therein, as set forth, combined with the hub $a$, provided with oil-passages $a'$, substantially as shown, and for the purpose described.

4. As an improved article of manufacture, a cast-metal pulley composed of a chambered rim and a hub provided with oil-passages to permit the circulation of oil introduced into a chamber of the rim through the hub to the shaft, along the shaft, and back into the chambers of the rim, as set forth, the said chambered rim being driven or shrunk upon the said hub, substantially as described, to form an oil-tight joint between them.

In testimony whereof I have signed my name to this specification in the presence of two subscribing witnesses.

CHARLES H. COWDREY.

Witnesses:
G. W. GREGORY,
ARTHUR REYNOLDS.